US012668476B2

(12) United States Patent
Huang et al.

(10) Patent No.: US 12,668,476 B2
(45) Date of Patent: Jun. 30, 2026

(54) METHOD AND SYSTEM FOR FILLING AND SEALING LIQUID-FILLED HARD CAPSULE

(71) Applicant: Wuhan Kornnac Technology Co., Ltd., Hubei (CN)

(72) Inventors: Jianhua Huang, Hubei (CN); Xianghan Zhou, Hubei (CN); Ye Chen, Hubei (CN); Chaohuang Liu, Hubei (CN); Fei Xiong, Hubei (CN); Yong Zeng, Hubei (CN); Zhiyong Zhang, Hubei (CN)

(73) Assignee: Wuhan Kornnac Technology Co., Ltd., Hubei (CN)

( * ) Notice: Subject to any disclaimer, the term of this patent is extended or adjusted under 35 U.S.C. 154(b) by 199 days.

(21) Appl. No.: 18/649,912

(22) Filed: Apr. 29, 2024

(65) Prior Publication Data

US 2025/0270082 A1 Aug. 28, 2025

(30) Foreign Application Priority Data

Feb. 23, 2024 (CN) ......................... 202410204987.2

(51) Int. Cl.
*B67C 3/02* (2006.01)
*A61J 3/07* (2006.01)

(52) U.S. Cl.
CPC .. *B67C 3/02* (2013.01); *A61J 3/07* (2013.01)

(58) Field of Classification Search
CPC . A61J 3/072; A61J 3/074; A61J 3/071; B67C 3/02
See application file for complete search history.

(56) References Cited

U.S. PATENT DOCUMENTS

| | | | | |
|---|---|---|---|---|
| 4,403,461 A * | 9/1983 | Goutard | A61J 3/072 53/900 |
| 9,314,966 B2 * | 4/2016 | Tochio | A61K 9/4816 |
| 10,751,255 B2 * | 8/2020 | Dierckx | A61J 3/072 |
| 2010/0018167 A1 * | 1/2010 | McCutcheon | A61J 3/072 53/329.2 |
| 2010/0212261 A1 * | 8/2010 | Boldis | A61J 3/074 53/403 |
| 2013/0186561 A1 * | 7/2013 | Van Rooyen | A61J 3/072 156/292 |
| 2018/0325777 A1 * | 11/2018 | Huysmans | A61J 3/005 |
| 2019/0110955 A1 * | 4/2019 | Dierckx | A61J 3/072 |

FOREIGN PATENT DOCUMENTS

CN 107157949 * 9/2017 ............. A61K 47/42

* cited by examiner

*Primary Examiner* — Andrew M Tecco
*Assistant Examiner* — Nicholas E Igbokwe
(74) *Attorney, Agent, or Firm* — JCIPRNET

(57) ABSTRACT

A method and a system for filling and sealing a liquid-filled hard capsule are provided. The method includes: separating a capsule body and a capsule cap, filling a material into the capsule body, and inflating an inert gas into the capsule cap, wherein the material at least includes a liquid; fitting the capsule cap and the capsule body obtained in step S1 to obtain a liquid-filled capsule; injecting a glue into a fitting gap, while applying pressure to the liquid-filled capsule, so that the glue fills the fitting gap using negative pressure, and then heating the fitting gap to implement sealing.

9 Claims, 2 Drawing Sheets

METHOD AND SYSTEM FOR FILLING AND SEALING LIQUID-FILLED HARD CAPSULE

CROSS-REFERENCE TO RELATED APPLICATION

This application claims the priority benefit of China application serial no. 202410204987.2, filed on Feb. 23, 2024. The entirety of the above-mentioned patent application is hereby incorporated by reference herein and made a part of this specification.

BACKGROUND

Technical Field

The disclosure belongs to the technical field of capsule encapsulation, and more specifically relates to a method and a system for filling and sealing a liquid-filled hard capsule.

Description of Related Art

The liquid-filled hard capsule has advantages such as being easy to absorb, convenient to take, and not generating powder during the preparation process, but the encapsulation technology thereof has high requirements and is difficult to control, and the encapsulation cost is also high. The filler of the liquid-filled capsule usually includes liquid and one or more of granules, micropellets, and small capsules (capsules in capsules), which are specifically filled into the hard capsule shell by adopting a filling machine to form the required liquid capsule. In order to prevent leakage of liquid medicine in the liquid capsule after filling, the interface between the upper shell and the lower shell of the hard capsule needs to be sealed to keep the hard capsule in a sealed state to ensure that the medicine inside is not contaminated or does not leak. There are two common sealing methods, external sealing (belt sealing) and internal sealing (spraying sealing liquid). For example, Chinese Patent Document No. CN107157949B discloses a method for sealing an inner part of a hard capsule and an application thereof. A material is filled inside a capsule body. A sealing liquid is carried by an inert gas and sprayed on an inner surface of a capsule cap to form a liquid film. The capsule body filled with the material and the capsule cap with the liquid film are closed, and then heated until the capsule is sealed intact, so that the inert gas can protect the material in the capsule. However, the internal sealing method has many issues. (1) Due to the poor solubility of the inert gas, the inert gas content in the sealing liquid is not high, and a part of the inert gas is lost during the spraying process, resulting in even less inert gas content encapsulated inside the capsule, which cannot play a good antioxidant role on the material in the capsule. (2) Due to the limitations of equipment technology and space, it is extremely difficult to spray the sealing liquid containing the inert gas in the form of spray in actual production, which is difficult to implement continuous efficient production. (3) During the process of spraying the sealing liquid into the capsule cap in advance and then closing the capsule, cross contamination of the material in the capsule may occur. (4) The adhesive sealing method has poor sealing reliability, and the material may be easily exposed.

SUMMARY

In view of the defects of the prior art, objectives of the disclosure are to provide a method and a system for filling and sealing a liquid-filled hard capsule, which are used to solve the issues of easy oxidation and contamination of a material and unreliable sealing when a conventional internal sealing method of the liquid-filled hard capsule is adopted.

To achieve the above object, the disclosure provides a method for filling and sealing a liquid-filled hard capsule. The hard capsule includes a capsule body and a capsule cap with edges capable of overlapping with and being fitted to each other. The method includes the following steps.

In S1, the capsule body and the capsule cap are separated, a material is filled into the capsule body, and an inert gas is inflated into the capsule cap. The material at least includes a liquid.

In S2, the capsule cap and the capsule body obtained in step S1 are fitted to obtain a liquid-filled capsule.

In S3, a glue is injected into a fitting gap, while applying pressure to the liquid-filled capsule, so that the glue fills the fitting gap using negative pressure, and the fitting gap is then heated to implement sealing.

Furthermore, a temperature of the inflated inert gas is within a range of 30° C. to 60° C.

Furthermore, an inflation rate in step S1 is within a range of 0.6 ml/s to 1.2 ml/s.

Furthermore, moisture contents of the capsule body and the capsule cap are different, and the following step is further executed between step S2 and step S3. The overall liquid-filled capsule is heated, so that surfaces of the capsule body and the capsule cap both lose water. The liquid-filled capsule after losing water is then cooled to generate a pressure difference between inside and outside. Step S3 is then executed.

Furthermore, a method for heating the liquid-filled capsule is heating the overall liquid-filled capsule, so that temperatures inside and outside the liquid-filled capsule both increase, and an internal gas is squeezed out from the fitting gap under internal pressure.

Furthermore, the liquid-filled capsule is heated at a temperature of 45° C. to 80° C.

Furthermore, the liquid-filled capsule is cooled at a temperature of 10° C. to 30° C.

Furthermore, a difference value between the moisture contents of the capsule body and the capsule cap is 1% to 2%.

Furthermore, in step S1, a method for separating the capsule body and the capsule cap is vertically disposing the empty hard capsule with the capsule cap located above the capsule body, and then vertically separating and staggering the capsule body and the capsule cap.

According to another aspect of the disclosure, a system for filling and sealing a liquid-filled hard capsule to implement the method according to any of the above is also provided. The system includes the following sequentially arranged in a circular manner.

A separating module is used to separate the capsule body and the capsule cap.

A filling module is used to fill the material into the capsule body.

An inflating module is used to inflate the inert gas into the capsule cap.

A capsule closing module is used to close the capsule body filled with the material and the capsule cap inflated with the inert gas to obtain the liquid-filled capsule.

A glue injecting module is used to inject the glue into the fitting gap of the liquid-filled capsule, while applying pressure to the liquid-filled capsule, so that the glue fills the fitting gap using negative pressure.

A local heating module is used to heat the glue in the fitting gap of the liquid-filled capsule to implement sealing. Preferably, an overall heating module and a cooling module are sequentially disposed between the glue injecting module and the local heating module. The overall heating module is used to heat the overall liquid-filled capsule, so that the surfaces of the capsule body and the capsule cap lose water. The cooling module is used to cool the liquid-filled capsule after losing water, so that the pressure difference is generated between the capsule cap and the capsule body.

The above technical solutions conceived by the disclosure have the following advantages compared with the prior art.

In the disclosure, the inert gas is inflated into the capsule cap to exhaust air inside the capsule cap, and the capsule cap and the capsule body filled with the material are then closed, thereby ensuring that there is a sufficient amount of inert gas in the closed capsule to protect the filled material. In addition, the inert gas is inflated into the capsule cap before closing the capsule, which can ensure that no other unwanted substance is mixed into the liquid-filled capsule after closing, thereby preventing contamination of the material in the liquid-filled capsule. Afterwards, the glue is injected only into the fitting gap between the capsule cap and the capsule body through negative pressure glue injection to prevent the glue from entering the liquid-filled capsule and contaminating the material. At the same time, the region of the fitting gap injected with the glue is heated in a targeted manner to implement tight connection and sealing of the fitting region.

The temperature of the inert gas in the disclosure is adjustable within the range of 30° C. to 60° C. The inert gas within the temperature range has the advantages of large average kinetic energy of gas molecules and small interaction force between molecules, and the diffusion rate of nitrogen is also fast. If the temperature exceeds the range, the disadvantages of unnecessary thermal deformation, thermal damage, and high energy consumption may occur to the capsule cap. If the temperature is lower than the range, the diffusion rate of nitrogen will decrease and the thermal energy will be insufficient, resulting in the failure to generate negative pressure due to temperature reduction and volume reduction in the subsequent cooling procedure.

The inflation rate of the inert gas in the disclosure is between 0.6 ml/s and 1.2 ml/s to adapt to the volume of the capsule cap of different specifications (00 #, 0 #, 1 #, 2 #, 3 #, and 4 #). If the rate is too fast, there will be issues of nitrogen gas flow lifting a capsule shell and nitrogen overflowing. If the rate is too slow, there will be issues such as that the volume of the capsule cap cannot be effectively inflated and the production rhythm of the whole machine cannot be matched.

The disclosure also provides the capsule body and the capsule cap with different moisture contents. After the two are closed to obtain the liquid-filled capsule, the overall liquid-filled capsule is heated to increase both the internal temperature and the external temperature. When the internal temperature increases, the pressure increases, which can squeeze the gas in the capsule out from the fitting gap, so that only the filling material remains in the liquid-filled capsule to ensure the purity of the filling material.

In the disclosure, when the overall liquid-filled capsule is heated to lose water, since the capsule body and the capsule cap with different moisture contents have different water loss shrinkage percentages during the heating process, the capsule cap and the capsule body after heating and cooling are more tightly fitted.

The encapsulation method of the disclosure is simple, fast, highly feasible, and can implement efficient encapsulation of large quantities of hard capsules. In addition, the encapsulation process does not introduce other pollution to the material inside the hard capsule and is more suitable for large-scale industrial production.

DESCRIPTION OF THE EMBODIMENTS

Figure 1:
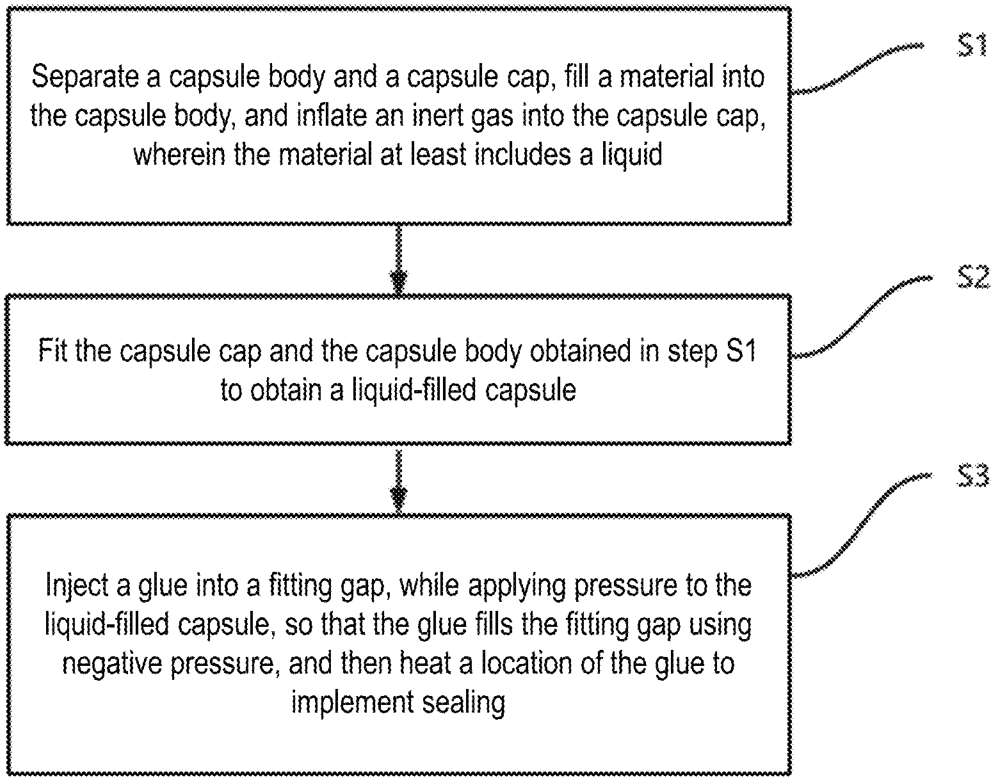
FIG. 1 is a schematic flowchart of a method for filling and sealing a liquid-filled hard capsule provided by an embodiment of the disclosure.

In order for the objectives, technical solutions, and advantages of the disclosure to be more clearly understood, the disclosure is further described in detail below in conjunction with the drawings and the embodiments. It should be understood that the specific embodiments described herein are only used to explain the disclosure and are not used to limit the disclosure.

An embodiment of the disclosure provides a method for filling and sealing a liquid-filled hard capsule. The hard capsule includes a capsule body and a capsule cap with edges capable of overlapping with and being fitted to each other. The method includes the following steps.

In S1, the capsule body and the capsule cap are separated in a vertical direction, a material is filled into the capsule body, and an inert gas is inflated into the capsule cap. The material at least includes a liquid. Specifically, multiple hard capsules are loaded to a separation station in batches, and external forces in opposite directions are respectively applied to the capsule body and the capsule cap to separate the two, and the separated capsule body and an opening of the capsule cap are offset and opposite to each other, and then respectively filled with the inert gas or the material.

In S2, the capsule cap and the capsule body obtained in step S1 are fitted to obtain a liquid-filled capsule. Specifically, the capsule cap and the capsule body are combined together through mechanical fitting.

In S3, a glue is injected into a fitting gap, while applying pressure to the liquid-filled capsule, so that the glue fills the fitting gap using negative pressure, and the fitting gap is then heated to implement sealing.

In the embodiment, in step S1, a method for separating the capsule body and the capsule cap is vertically disposing the empty hard capsule with the capsule cap located above the capsule body, and then vertically separating and staggering the capsule body and the capsule cap, so that the inert gas can be inflated into the capsule cap from bottom to top, and the inert gas can better expel air in the capsule cap.

In the embodiment, a temperature of the inflated inert gas is within a range of 30° C. to 60° C., such as 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., and 60° C. At these temperatures, the inert gas has the advantages of large average kinetic energy of gas molecules and small interaction force between molecules, and the diffusion rate of nitrogen is also fast. If the temperature exceeds the range, the disadvantages of unnecessary thermal deformation, thermal damage, and high energy consumption may occur to the capsule shell. If the temperature is lower than the range, the diffusion rate of nitrogen will decrease and the thermal energy will be insufficient, resulting in the failure to generate negative pressure due to temperature reduction and volume reduction in the subsequent cooling procedure.

In the embodiment, an inflation rate in step S1 is within a range of 0.6 ml/s to 1.2 ml/s, such as 0.6 ml/s, 0.7 ml/s, 0.8 ml/s, 0.9 ml/s, 1.0 ml/s, 1.1 ml/s, and 1.2 ml/s. If the inflation rate is too fast, there is a risk of lifting the capsule shell, causing nitrogen overflow. If the rate is too slow, the volume of the capsule cap cannot be effectively inflated, the inflation amount is insufficient, and the production rhythm of the whole machine cannot be matched.

In the embodiment, preferably, a volume of the inert gas inflated into the capsule cap is 1.2 times a volume of the capsule cap, so that the air in the capsule cap can be completely expelled by the inflated inert gas, and the amount of the inert gas used can be saved.

Specifically, the inert gas is preferably nitrogen, and other inert gases, such as helium (He), neon (Ne), argon (Ar), krypton (Kr), xenon (Xe), or radon (Rn), may also be adopted.

In a preferred embodiment, moisture contents of the capsule body and the capsule cap are different, and the following step is further executed between step S2 and step S3. The overall liquid-filled capsule is heated, so that surfaces of the capsule body and the capsule cap both lose water to generate a pressure difference. The liquid-filled capsule after losing water is then cooled. Step S3 is then executed.

Specifically, preparation methods of the capsule body and the capsule cap adopt conventional methods, as long as the moisture contents of the capsule body and the capsule cap meet the requirements of the embodiment. For example, the moisture content of the capsule body is 14% and the moisture content of the capsule cap is 15% or 16%, or the moisture content may be any moisture content value between 15% and 16%.

Further preferably, a method for heating the liquid-filled capsule is heating the overall liquid-filled capsule, so that temperatures inside and outside the liquid-filled capsule both increase, and an internal gas is squeezed out from the fitting gap under internal pressure, thereby ensuring the purity of the material in the liquid-filled capsule and preventing contamination.

Specifically, the overall liquid-filled capsule is sent into a high-temperature environment, and the temperatures inside and outside the overall liquid-filled capsule both increase. The inert gas inside is discharged from the fitting gap under pressure, so that only the filling material remains inside the liquid-filled capsule without being affected by any other substances.

Further preferably, the temperature for heating the liquid-filled capsule is 45° C. to 80° C., that is, the high-temperature environment provided by an overall heating module may be any one of 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., etc., or the high-temperature environment is between any two of the above temperatures, thereby implementing stable water loss shrinkage of the liquid-filled capsule.

Further preferably, the temperature for cooling the liquid-filled capsule is 10° C. to 30° C., such as any temperature among 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., etc. or between any two of the above temperatures, so that the pressure difference is generated inside and outside the liquid-filled capsule, and the fitting is tighter.

Furthermore, a difference value between the moisture contents of the capsule body and the capsule cap is 1% to 2%. For example, the moisture content of the capsule body is 1%, 1.5%, or 2% less than the moisture content of the capsule cap. Specifically, the different moisture contents may be implemented through controlling the thickness of the capsule shell. For example, if the glue thickness of the capsule cap is controlled to be 0.01 mm to 0.02 mm thicker than the glue thickness of the capsule body, after the same drying process, the moisture content of the obtained capsule cap will be 1% to 2% higher than the moisture content of the capsule body. If the difference value between the moisture contents of the capsule body and the capsule cap is too large, the tolerance of the fitting gap of the cap body will be very unstable, which will cause poor pre-locking of the capsule body and the capsule cap (because the hollow capsule shell is transported after the capsule cap and the capsule body are pre-fitted, which can prevent deformation of the capsule cap and the capsule body when being separately transported). During the subsequent drying process, a high moisture content may cause shrinkage deformation to be too severe, resulting in permanent deformation or even cracks due to excessive locking force between the capsule body with excessive shrinkage and the normally shrunk capsule cap, which is not conducive to sealing of the capsule.

Specifically, when the capsule cap is capped onto the outer surface of the capsule body, the moisture content of the capsule body is 1% to 2% lower than the moisture content of the capsule cap, so that the capsule cap shrinks more than the capsule body and can be tightly capped onto the capsule body. If the capsule cap is capped onto the inner side of the capsule body, the moisture content of the capsule body is 1% to 2% higher than the moisture content of the capsule cap, so that the capsule body shrinks more than the capsule cap and the two can be more tightly fitted.

According to another aspect of the disclosure, a system for filling and sealing a liquid-filled hard capsule to implement the method according to any of the above is also provided. The system includes the following sequentially arranged in a circular manner.

A separating module is used to separate the capsule body and the capsule cap.

A filling module is used to fill the material into the capsule body.

An inflating module is used to inflate the inert gas into the capsule cap.

A capsule closing module is used to close the capsule body filled with the material and the capsule cap inflated with the inert gas to obtain the liquid-filled capsule.

A glue injecting module is used to inject the glue into the fitting gap of the liquid-filled capsule, while applying pressure to the liquid-filled capsule, so that the glue fills the fitting gap using negative pressure.

A local heating module is used to heat the glue in the fitting gap of the liquid-filled capsule to implement sealing.

Specifically, the separating module, the filling module, the inflating module, the capsule closing module, the glue injecting module, etc. in the system are all located on a rotating base. As the rotating base rotates, a carrier component for loading the hard capsule may sequentially pass through the separating module, the filling module, the inflating module, the capsule closing module, the glue injecting module, etc., so as to complete multi-station filling and sealing operations of the hard capsule.

In the embodiment, the overall heating module and the cooling module are sequentially disposed between the glue injecting module and the local heating module. The overall heating module is used to heat the overall liquid-filled capsule, so that the surfaces of the capsule body and the capsule cap both lose water. The cooling module is used to cool the liquid-filled capsule after losing water, so that the pressure difference is generated between the capsule cap and the capsule body. Specifically, the overall heating module is a temperature-adjustable drying tunnel. An entire row of hard capsules after glue injection is sent into the drying tunnel at a specific temperature to be heated to lose water and shrink. The cooling module is a temperature-adjustable cooling channel that is lower than the drying tunnel. After cooling, the fitting of the hard capsule is tighter due to the pressure difference between inside and outside.

In order to better illustrate the implementation details of the disclosure, the following examples are provided to further illustrate the disclosure. It should be understood that the following examples are only intended as the optimal implementation manners and are not intended to limit the protection scope of the disclosure.

Example 1

Figure 2:
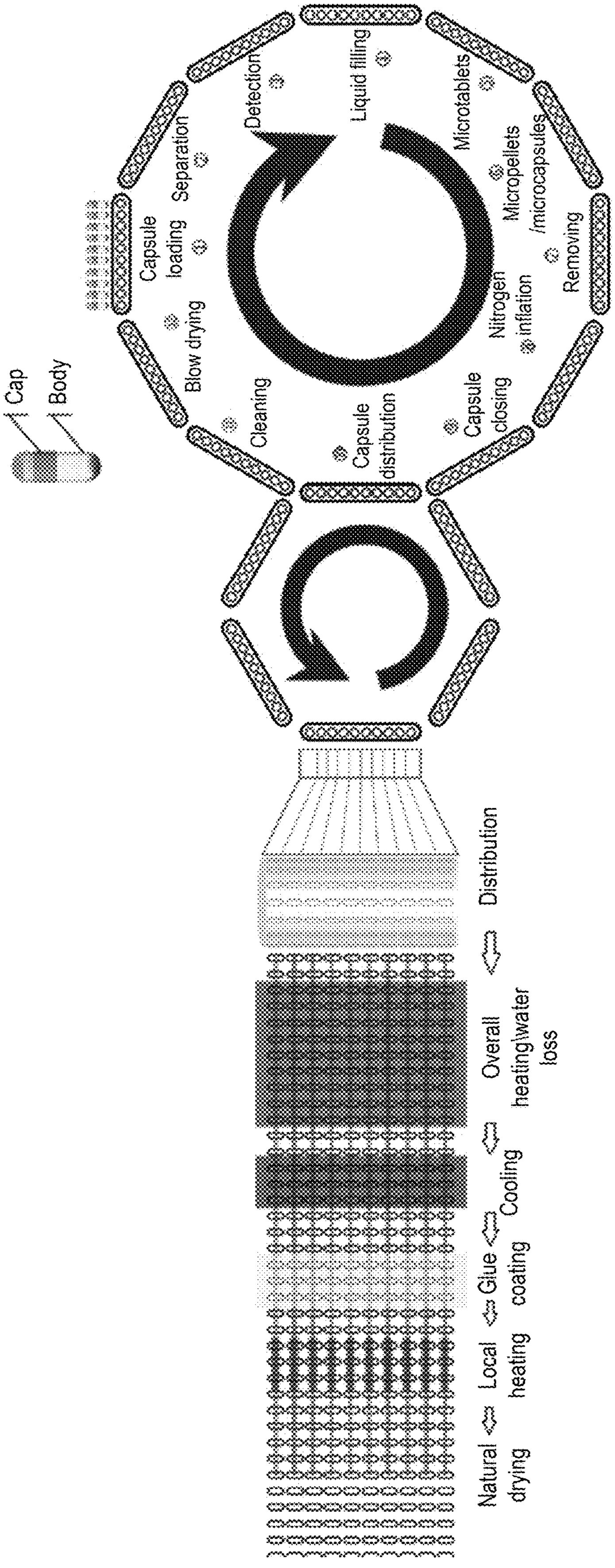
FIG. 2 is a schematic process flowchart of a method for filling and sealing a liquid-filled hard capsule provided by an embodiment of the disclosure.

In the example, a capsule body and a capsule cap having the same moisture content were adopted, and the materials of the capsule body and the capsule cap both included gelatin. As shown in FIG. 2, the steps of filling and sealing included the following.

(1) During capsule loading, rows of empty hard capsules were conveyed to a separation station.

(2) During separation, the capsule cap and the capsule body were vertically separated and staggered.

(3) During detection, whether there was any empty capsule that was not completely separated was detected, and the capsule that was not completely separated was removed.

(4) During liquid filling, a composite preparation composed of oil and micropellets was filled into the capsule. In other examples, liquid, micropellets, microtablets, or microcapsules on stations 4 and 5 in the drawing may be filled in any combination.

(5) During nitrogen inflation, nitrogen at 40° C. was continuously inflated into the capsule cap at an inflation rate of 0.8 ml/s until full.

(6) During capsule closing, the capsule cap filled with nitrogen and the capsule body filled with the compound preparation were fitted to obtain a liquid-filled capsule. The fitting manner was mechanical fitting, that is, after opening ends of the capsule cap and the capsule body were aligned and placed, the capsule cap and the capsule body were controlled to move vertically closer to implement fitting.

(7) During capsule distribution, the closed liquid-filled capsule was sent to a distribution station for arrangement.

(8) Then, a glue was injected into a fitting gap between the arranged capsule cap and capsule body, while applying pressure to the liquid-filled capsule, so that the glue filled the fitting gap using negative pressure, and the fitting gap was then heated to implement sealing. Specifically, when the entire row of closed capsules passed through the glue injecting module, there were several rows of rollers at the bottom of the glue injecting module, edges of the rollers were provided with water-absorbent soft materials, and the rollers could rotate in the glue located below. The glue adopted in the example has various forms, including but not limited to liquid paraffin, ethanol solution, etc. When one side of the roller adsorbed with the sealing glue rotates to the top, the side may contact the fitting gap of the fitting capsule that can be transported above, pressure is applied to the top of the capsule cap, and the glue in the edge of the roller is controlled to be discharged. At the same time, capillary and negative pressure effects are used, so that the glue fully enters all the fitting gaps between the capsule body and the capsule cap.

(9) Heat was locally conducted to the fitting part of the capsule cap and the capsule body using a heat conducting sheet, so that a sealing liquid reacted with the gelatin materials used in the capsule body and the capsule cap, and gelatin bodies were adhered together to implement tight adhesion. Finally, the tightly adhered rows of capsules were dried by natural air blowing to form a sealed capsule product.

In order to verify the sealing of the capsule product, the capsule product may be subsequently detected for sealing through a detection station. The specific detection method is sprinkling safety preparation powder on the sealed capsule product during conveyance, and then applying appropriate amount of wind and vibration to the sealed capsule. If there is oil leakage from inside the capsule, the oil will adhere to the safety preparation powder, and the safety agent powder will not cleanly fall off during vibration. Then, the sealing of each capsule is judged through a visual camera, and an unsealed capsule is removed by adopting a mechanical structure.

Example 2

In the example, the capsule body and the capsule cap respectively having moisture contents of 14% and 16% were adopted. With reference to FIG. 2, compared with Example 1, this example included additional overall heating water loss and cooling steps as shown in FIG. 2. The specific encapsulation step included the following.

First, the capsules were loaded, and multiple rows of empty hard capsules were transported to the separation station, and the capsule caps and capsule bodies were vertically separated and staggered. Then, the composite preparation composed of oil and micropellets was filled into the capsule body, while inflating nitrogen at 60° C. into the capsule cap at an inflation rate of 1.2 ml/s, and then the capsule cap and the capsule body were aligned and fitted.

Then, the rows of liquid-filled capsules were sent to a heating drying tunnel at a temperature of 45° C. for overall heating, so that the surfaces of the capsule body and the capsule cap lose water to varying degrees. The liquid-filled capsules after losing water were then sent to a cooling channel at a temperature of 10° C. for cooling, so that the temperature inside the capsule was lowered, the pressure was reduced, the capsule cap was more tightly capped onto the capsule body, and a pressure difference was formed inside and outside the liquid-filled capsules, thereby fitting more tightly.

Then, the glue was injected into the fitting gap, while applying pressure to the liquid-filled capsule, so that the glue filled the fitting gap using negative pressure, the fitting part was then locally heated to implement sealing, and the sealed capsule product was naturally air-dried.

One thousand samples were taken from fish oil capsule products encapsulated using a conventional method. Then, one thousand capsules were taken from fish oil capsule products obtained by a method for inflating nitrogen into the capsule cap provided by the method of the disclosure. As shown in Table 2, 99.9% of the fish oil capsules encapsulated by adopting the nitrogen filling method did not undergo obvious oxidative discoloration, but all the fish oil capsules prepared by the conventional method underwent oxidative discoloration and did not meet the encapsulation requirements.

TABLE 1

Comparison of yield of capsule products obtained by conventional encapsulation method and encapsulation method of disclosure

| Quantity (1,000 capsules) | Fish oil product encapsulated by conventionally method | Fish oil product encapsulated by method of disclosure |
|---|---|---|
| Fish oil capsule sample | 0% (all colors underwent oxidative discoloration, unqualified) | 99.9% (no obvious oxidative discoloration) |

Then, four samples were taken from the capsule products obtained by the conventional encapsulation method, and the number of capsules in each sample was 10,000. Four samples were taken from the capsule products obtained by encapsulation using the method provided by the disclosure such that the capsule body and the capsule cap had different moisture contents and nitrogen was introduced, the number of capsules in each sample was also 10,000, and each sample was a capsule product of different models and specifications (0 #, 1 #, 2 #, and 3 #). As shown in Table 2 below, it is found that there is a large difference in the sealing yield between the capsule products encapsulated by adopting the conventional method and the capsule products encapsulated by adopting the capsule bodies having different moisture contents. For every 10,000 capsule products, the yield of the capsule products encapsulated by the method of the disclosure exceeds 99.8%, while the yield of the capsule products encapsulated by the conventional method is less than 99.6%.

TABLE 2

Comparison of yield of capsule products obtained by conventional encapsulation method and encapsulation method of disclosure

| Quantity (10,000 capsules each) | Capsule product encapsulated by conventional method | Capsule product encapsulated by method of disclosure |
|---|---|---|
| Sample 1 (0#) | 99.32% | 99.80% |
| Sample 2 (1#) | 99.57% | 99.85% |
| Sample 3 (2#) | 99.28% | 99.92% |
| Sample 4 (3#) | 99.38% | 99.95% |

In the description of the disclosure, it is necessary to understand that orientations or positional relationships indicated by terms such as "center", "upper", "lower", "front", "back", "left", "right", "vertical", "horizontal", "inside", "outside", "clockwise", "counterclockwise", "axial", "radial", and "circumferential" are based on orientations or positional relationships shown in the drawings and are only for the convenience of describing the disclosure and simplifying the description, and do not indicate or imply that the indicated device or element must have a specific orientation or be constructed and operated in a specific orientation, and thus should not be understood as a limitation to the disclosure.

In addition, the terms "first" and "second" are used for descriptive purposes only and should not be understood as indicating or implying relative importance or implicitly indicating the quantity of the indicated technical features. Therefore, features defined as "first" or "second" may explicitly or implicitly include one or more of such features. In the description of the disclosure, "multiple" means two or more than two, unless otherwise clearly and specifically defined.

In the disclosure, unless otherwise expressly specified or limited, terms such as "installed", "communicated", "connected", and "fixed" should be understood in a broad sense, for example, a connection may be a fixed connection, a detachable connection, or an integral connection; may be a mechanical connection or an electrical connection; may be directly connected or indirectly connected through an intermediate medium, or may also be an internal connection between two elements. For persons skilled in the art, the specific meanings of the above terms in the disclosure can be understood according to specific circumstances.

The above description is only a preferred embodiment of the disclosure and is not intended to limit the disclosure. Any modifications, equivalent substitutions, and improvements made within the spirit and principles of the disclosure should be included in the protection scope of the disclosure.

What is claimed is:

1. A method for filling and sealing a liquid-filled hard capsule, wherein the hard capsule comprises a capsule body and a capsule cap with edges capable of overlapping with and being fitted to each other, the method comprising following steps:

step S1 of separating the capsule body and the capsule cap, filling a material into the capsule body, and inflating an inert gas into the capsule cap, wherein the material at least comprises a liquid;

step S2 of fitting the capsule cap and the capsule body obtained in the step S1 to obtain a liquid-filled capsule;

step S3 of injecting a glue into a fitting gap, while applying pressure to the liquid-filled capsule, so that the glue fills the fitting gap using negative pressure, and then heating a location of the glue to implement sealing, wherein moisture contents of the capsule body and the capsule cap are different, and between the step S2 and the step S3, the method further comprises: heating the overall liquid-filled capsule, so that surfaces of the capsule body and the capsule cap both lose water; then cooling the liquid-filled capsule after losing water to generate a pressure difference between inside and outside; and then executing the step S3.

2. The method for filling and sealing the liquid-filled hard capsule according to claim 1, wherein a temperature of the inert gas which is inflated is within a range of 30° C. to 60° C.

3. The method for filling and sealing the liquid-filled hard capsule according to claim 1, wherein an inflation rate in the step S1 is within a range of 0.6 ml/s to 1.2 ml/s, and a volume of the inert gas inflated into the capsule cap is 1.2 times a volume of the capsule cap.

4. The method for filling and sealing the liquid-filled hard capsule according to claim 1, wherein a method for heating the overall liquid-filled capsule is heating the overall liquid-filled capsule, so that temperatures inside and outside the liquid-filled capsule both increase, and an internal gas is squeezed out from the fitting gap under internal pressure.

5. The method for filling and sealing the liquid-filled hard capsule according to claim 4, wherein the liquid-filled capsule is heated at a temperature of 45° C. to 80° C.

6. The method for filling and sealing the liquid-filled hard capsule according to claim 1, wherein the liquid-filled capsule is cooled at a temperature of 10° C. to 30° C.

7. The method for filling and sealing the liquid-filled hard capsule according to claim 1, wherein a difference value between the moisture contents of the capsule body and the capsule cap is 1% to 2%.

8. The method for filling and sealing the liquid-filled hard capsule according to claim 1, wherein, in the step S1, a method for separating the capsule body and the capsule cap is vertically disposing an empty hard capsule with the capsule cap located above the capsule body, and then vertically separating and staggering the capsule body and the capsule cap.

9. A system for filling and sealing the liquid-filled hard capsule to implement the method according to claim 1, the system comprising, sequentially arranged in a circular manner:

a separating module, used to separate the capsule body and the capsule cap;

a filling module, used to fill the material into the capsule body;

an inflating module, used to inflate the inert gas into the capsule cap;

a capsule closing module, used to close the capsule body filled with the material and the capsule cap inflated with the inert gas to obtain the liquid-filled capsule;

a glue injecting module, used to inject the glue into the fitting gap of the liquid-filled capsule, while applying pressure to the liquid-filled capsule, so that the glue fills the fitting gap using negative pressure;

a local heating module, used to heat the glue in the fitting gap on the liquid-filled capsule to implement sealing, wherein an overall heating module and a cooling module are sequentially disposed between the glue injecting module and the local heating module, the overall heating module is used to heat the overall liquid-filled capsule, so that the surfaces of the capsule body and the capsule cap lose water, the cooling module is used to cool the liquid-filled capsule after losing water.

* * * * *